United States Patent [19]

Kato

[11] Patent Number: 5,759,453
[45] Date of Patent: Jun. 2, 1998

[54] OPTICAL MODULE AND A FABRICATION PROCESS THEREOF

[75] Inventor: Masayoshi Kato, Sagamihara, Japan

[73] Assignee: Ricoh Company, Ltd., Tokyo, Japan

[21] Appl. No.: 670,015

[22] Filed: Jun. 25, 1996

Related U.S. Application Data

[62] Division of Ser. No. 272,734, Jul. 11, 1994, Pat. No. 5,555,333.

[30] Foreign Application Priority Data

| Jul. 12, 1993 | [JP] | Japan | 5-171726 |
| Aug. 23, 1993 | [JP] | Japan | 5-207365 |
| Oct. 22, 1993 | [JP] | Japan | 5-264763 |
| Dec. 16, 1993 | [JP] | Japan | 5-315709 |
| May 6, 1994 | [JP] | Japan | 6-94144 |

[51] Int. Cl.$^6$ .............. B29D 11/00; G02B 6/36
[52] U.S. Cl. .............. 264/1.25; 65/105; 65/112; 65/60.53; 65/60.8; 264/1.27; 264/2.5; 427/162; 427/165
[58] Field of Search .............. 385/14, 15, 18, 385/39, 42, 47, 49, 89, 90, 83; 264/1.1, 1.24, 1.25, 2.5, 1.27; 65/31, 60.1, 60.2, 60.53, 60.8, 105, 112; 427/162, 165

[56] References Cited

U.S. PATENT DOCUMENTS

| 5,121,457 | 6/1992 | Foley et al. | 385/89 |
| 5,155,786 | 10/1992 | Ecker et al. | 385/89 |
| 5,241,614 | 8/1993 | Ecker et al. | 385/89 |
| 5,620,634 | 4/1997 | Shahid | 264/1.25 |
| 5,687,267 | 11/1997 | Uchida | 385/89 |

*Primary Examiner*—Mathieu D. Vargot
*Attorney, Agent, or Firm*—Oblon, Spivak, McClelland, Maier & Neustadt, P.C.

[57] ABSTRACT

An optical module includes an optical connector element formed of first and second substrates for carrying optical fibers therebetween, and a device substrate carrying photodiodes on an upper major surface thereof in correspondence to the optical fibers, wherein the optical connector element is mounted upon the device substrate such that end surfaces of the first and second substrates face the principal surface of the device substrate and such that polygonal projections provided on the principal surface of the device substrate for positioning engage with corresponding spaces formed between the first and second substrates at the foregoing end surfaces.

4 Claims, 10 Drawing Sheets

FIG. I PRIOR ART
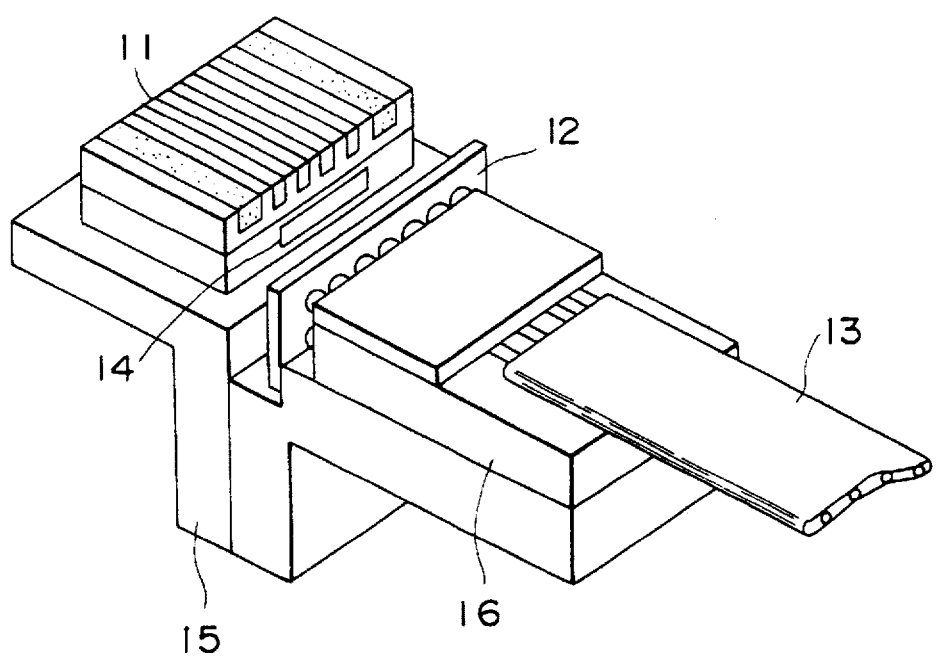

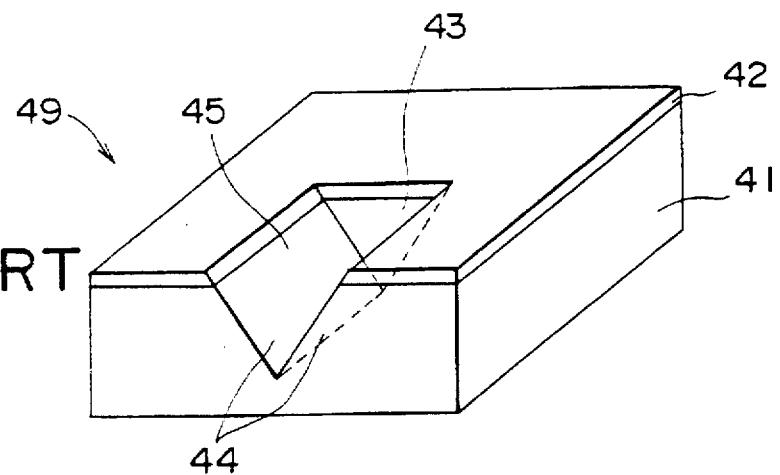
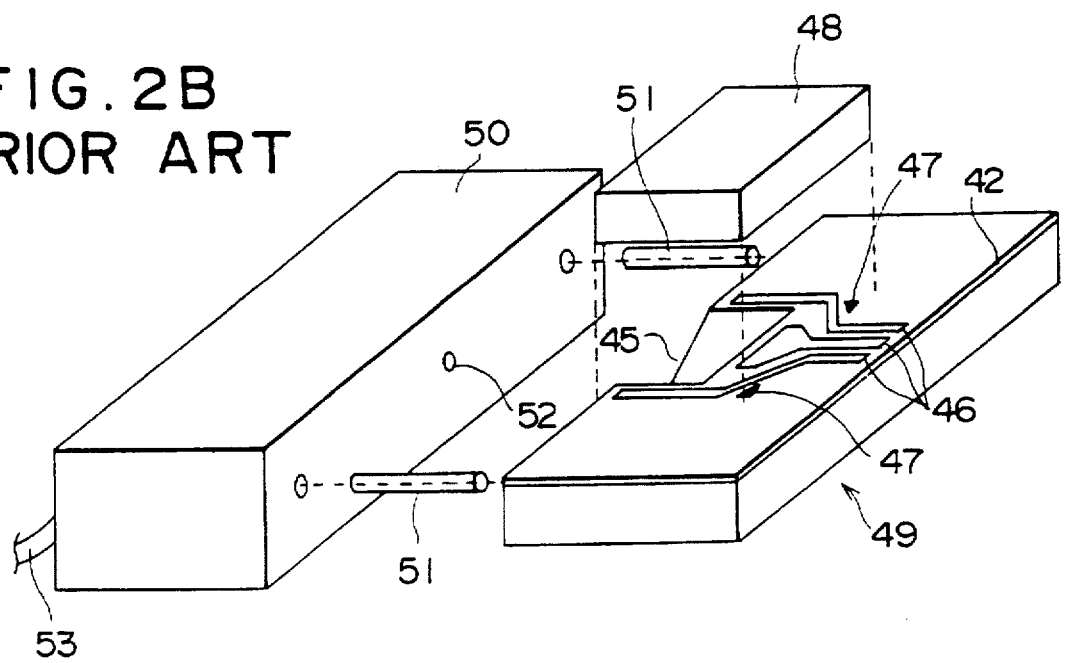

FIG.5A  FIG.5B  FIG.5C
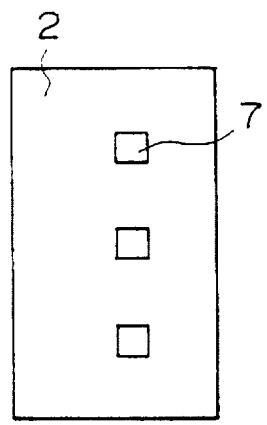
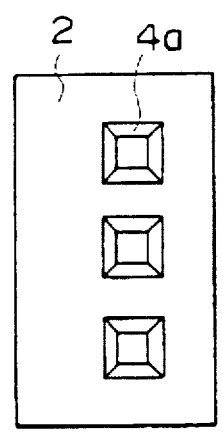
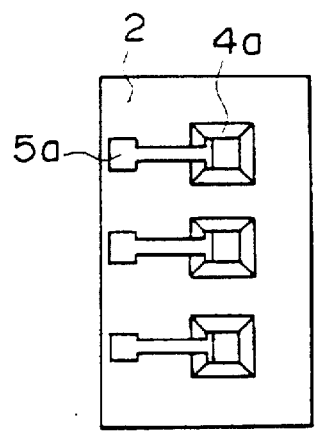
FIG.6A
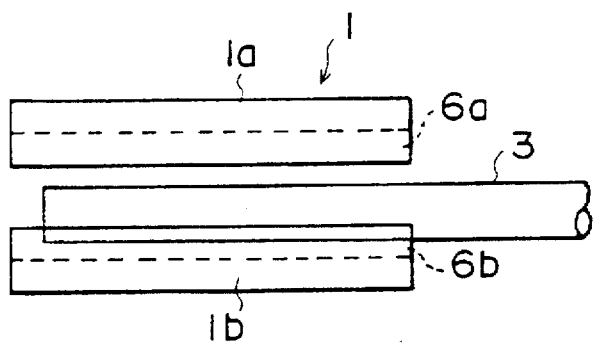
FIG.6B
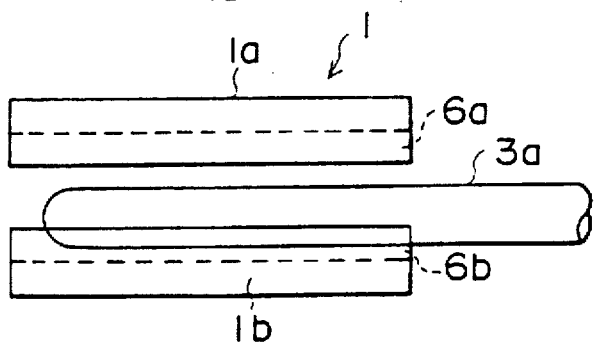
FIG.6C
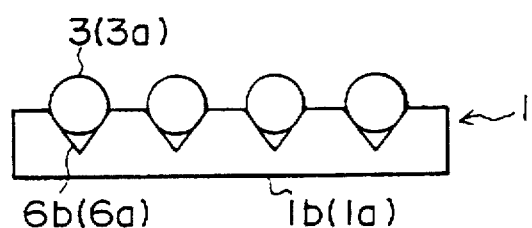

FIG. 13A
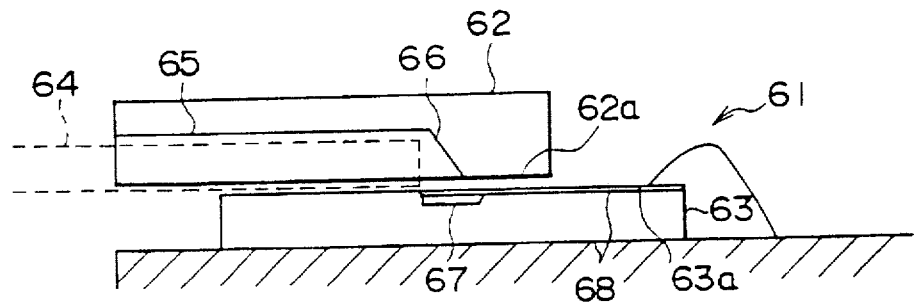
FIG. 13B
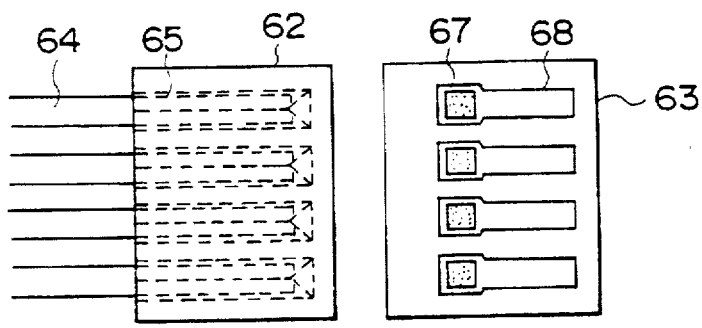
FIG. 14A FIG. 14B FIG. 14C
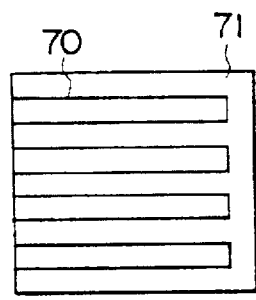 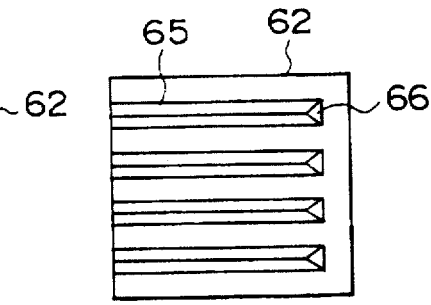 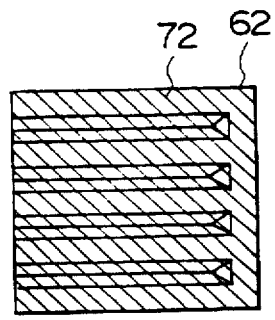
FIG. 14D FIG. 14E FIG. 14F
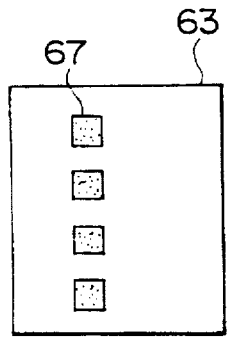 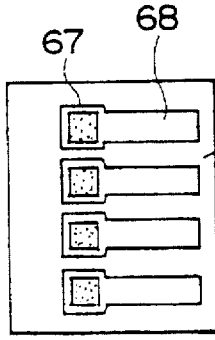 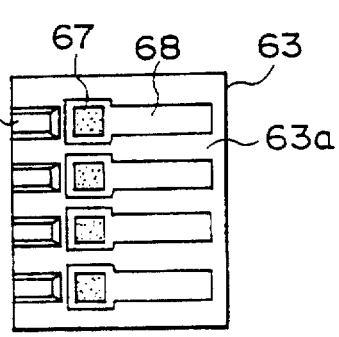

OPTICAL MODULE AND A FABRICATION PROCESS THEREOF

This is a division of application Ser. No. 08/272,734, filed on Jul. 11, 1994, now U.S. Pat. No. 5,555,333.

BACKGROUND OF THE INVENTION

The present invention generally relates to optical transmission of information and more particularly to an optical transmission module for use in optical telecommunications, optical information processings, optical interconnections, and the like.

Optical transmission modules are used extensively in optical telecommunication systems for interconnecting and/ or switching optical paths. Further, such optical transmission modules are used also for various optical information processings.

FIG. 1 shows the construction of a conventional optical reception module disclosed by Moriya et al., in IEICE, spring meeting 1992, C-269, p. 4-311.

Referring to FIG. 1, the optical reception module includes a carrier 11, a lens array 12, a flat optical fiber cable 13, a photodiode array 14, an adjustment block 14, and an alignment member 16, wherein the photodiode array 14 is carried by the carrier 11, and the carrier 11 is held on an adjustment block 15. The alignment member 16 is formed of a silicon block having V-grooves for holding optical fibers that are arranged to form the flat optical fiber cable 13. Further, the lens array 12 carries thereon a plurality of monolithic microlenses for focusing the optical beams in the optical fibers forming the cable 13, upon corresponding photodiodes that form the photodiode array 14.

The conventional optical reception module of FIG. 1, having such a construction for mounting the optical elements and the optical fibers separately on an adjustment block, has a problem in that one has to achieve a complex optical alignment process for each of the modules. Further, the optical reception module having such a construction tends to have a large size.

FIGS. 2A and 2B show another conventional optical module used for optical path conversion disclosed in the Japanese Laid-open Patent Publication 4-208905, wherein the optical module achieves an efficient optical coupling between an optical semiconductor device and an optical waveguide with a reduced number of parts and correspondingly simple process for alignment. Further, the optical module of FIGS. 2A and 2B has an advantageous feature of reduced backward propagation of optical beam. It should be noted that the device of FIGS. 2A and 2B achieves the desired optical coupling by using the exposed crystal surfaces defining a depression in a semiconductor substrate, for a reflection surface.

FIG. 2A shows the construction of a reflector block 49 in an enlarged scale, while FIG. 2B shows the mounting of a photodiode block 48 on the reflector block 49, together with a fiber connector 50 provided at an end of an optical fiber 53.

Referring to FIGS. 2A and 2B, the reflector block 49 includes a silicon substrate 41 covered by an oxide film 42, wherein a V-shaped recess 45 is formed on the surface of the oxide film 42 as well as in the silicon substrate 41 by an anisotropic etching process, such that the recess 45 extends to the interior of the substrate 41. More specifically, a groove is formed on the oxide film 42 in correspondence to the recess 45 to be formed, by employing a suitable masking process, so as to expose the surface of the silicon substrate 41, followed by an anisotropic etching process applied to the exposed surface of the silicon substrate 41. Thereby, the recess 45 is defined by a pair of side walls 43 and 44 acting as reflecting surfaces. Typically, the side walls 43 and 44 are formed of a crystal surface having an {111} orientation.

The reflector block 49 thus formed is then provided with a marker 47 on the surface thereof, and the photodiode block 48 is mounted upon the surface of the reflector block 49 according to a flip-chip process. By providing an interconnection pattern 46 on the surface of the oxide film 42, it is possible to achieve the mounting of the photodiode block 48 and the interconnection in a single step.

The optical connection between the fiber connector 50 and the reflector block 49 is achieved by abutting both blocks with each other with a high precision alignment achieved by a pair of alignment pins 51 that engage with the side walls of the block 48. Thus, the alignment pins are provided with a high precision with respect to the end of the optical fiber 53 held in the connector 50 and designated in FIG. 2B by a numeral 52. Upon mounting of the photodiode block 48, an optical coupling is achieved between the photodiode in the photodiode block 48 and the optical fiber 52 in the connector 50 by way of the reflection surfaces 43 and 44 that form the recess 45.

The optical module of FIGS. 2A and 2B thus constructed, on the other hand, has a drawback, associated with use of the polygonal mirror surfaces defining the recess 45, of degraded optical performance such as aberration when focusing the optical beam in the optical connector 50 upon the photodiode block 48. It should be noted that, because of the use of the polygonal reflection surface in the block 49, the optical beam emitted at the end 52 of the optical fiber 53 does not converge upon the corresponding photodiode. Further, the optical module has a problem of mechanical strength as well as cost associated with the use of fragile and expensive silicon substrate.

SUMMARY OF THE INVENTION

Accordingly, it is a general object of the present invention to provide a novel and useful optical reception unit wherein the foregoing problems are eliminated.

Another and more specific object of the present invention is to provide a compact optical module easy for the optical alignment process.

Another object of the present invention is to provide an optical module, comprising:

an optical connector element carrying one or more optical fibers, said optical connector element having an end surface and a pair of major surfaces, said end surface being formed with at least a pair of positioning spaces at respective, predetermined positions, said optical connector element carrying said one or more optical fibers such that said optical fibers extend generally parallel to said pair of major surfaces in a direction toward said end surface; and a device substrate carrying one or more optical devices on an upper major surface thereof in correspondence to said one or more optical fibers;

said device substrate having at least a pair of polygonal projections on said upper major surface at respective predetermined positions corresponding to said two positioning spaces on said end surface of said optical connector element;

said device substrate being mounted upon said optical connector element such that said end surface of said optical connector element faces said upper major surface of said device substrate and such that said polygonal projections on said upper major surface of said device substrate engage with said positioning spaces on said end surface of optical connector element.

According to the present invention, one can eliminate the adjustment process for optical alignment between said optical fibers and said optical devices when assembling the optical module, by providing the aforementioned spaces on the end surface of the optical connector element so as to mate with the polygonal projections on the upper major surface of the device substrate, with a predetermined positional relationship to the optical fibers held on the optical connector element, and by simply mounting the optical connector element upon the device substrate such that the polygonal projections engage with the corresponding spaces.

In a preferred embodiment of the present invention, said optical connector element comprises a substrate serving for a connector substrate, said connector substrate having an end surface coincident to said end surface of said optical connector and carrying a plurality of grooves extending generally parallel with each other on an upper major surface thereof for holding said optical fibers such that said optical fibers extend toward said end surface of said connector substrate, wherein at least two of said grooves form said spaces at said end surface of said connector substrate.

In a preferred embodiment of the present invention, said optical connector element further includes another, second connector substrate having an upper major surface and an end surface and disposed on said first connector substrate such that said upper major surface of said first connector substrate and said upper major surface of said second connector substrate face with each other and said end surfaces of said first and second connector substrates form a flush surface coincident to said end surface of said optical connector element, said upper major surface of said second connector substrate carrying a plurality of grooves extending parallel with each other with an identical pitch as said grooves on said upper major surface of said first connector substrate such that said grooves on said first connector substrate and said grooves on said second connector substrate define together spaces for holding said optical fibers therein and further said positioning spaces at said end surface of said optical connector element.

In a preferred embodiment of the present invention, each of said polygonal projections is defined by crystal surfaces of a crystal forming said device substrate.

In a preferred embodiment of the present invention, each of said polygonal projections has a base area larger than a top face area.

In a preferred embodiment of the present invention, said optical module further includes optical fibers having respective ends and held in said grooves formed on said first and second connector substrates to form said spaces, such that said ends of said optical fibers face said upper major surface of said device substrate, wherein each of said plurality of optical fibers has a lens at said end for focusing an optical beam therein on said optical device on said upper major surface of said device substrate.

In a preferred embodiment of the present invention, said optical module further includes optical fibers having respective ends and held in said grooves formed on said first and second connector substrates to form said spaces, such that said ends of said optical fibers face said upper major surface of said device substrate, wherein each of said plurality of optical fibers is fixed in said space by an adhesive filling said space.

Another object of the present invention is to provide a method for manufacturing an optical module that includes: a first substrate carrying one or more grooves on an upper major surface thereof at respective, predetermined positions, said one or more grooves extending substantially parallel with each other for carrying one or more optical fibers therein; and a second substrate carrying one or more optical devices on an upper major surface thereof in correspondence to said one or more optical fibers; said second substrate having at least a pair of polygonal projections at respective predetermined positions on said upper major surface of said first substrate; said second substrate being mounted upon said first substrate such that an end surface of said first substrate faces said upper major surface of said second substrate and such that said polygonal projections on said upper major surface of said second substrate engage with corresponding grooves on said upper major surface of said first substrate, at said end surface of said first substrate; said method comprising a step of:

forming said polygonal projections by applying an anisotropic etching process to said device substrate.

According to the present invention, one can form the positioning projections at an exact position with an exact shape, determined by crystal surfaces, by way of a photolithographic patterning process.

Another object of the present invention is to provide a method for manufacturing an optical module that includes: a first substrate carrying one or more grooves on an upper major surface thereof at respective, predetermined positions, said one or more grooves extending substantially parallel with each other for carrying one or more optical fibers therein; and a second substrate carrying one or more optical devices on an upper major surface thereof in correspondence to said one or more optical fibers; said second substrate having at least a pair of polygonal projections at respective predetermined positions on said upper major surface of said first substrate; said second substrate being mounted upon said first substrate such that an end surface of said first substrate faces said upper major surface of said second substrate and such that said polygonal projections on said upper major surface of said second substrate engage with corresponding grooves on said upper major surface of said first substrate, at said end surface of said first substrate; said method comprising the steps of:

forming grooves corresponding to said grooves on said first and second connector substrates, on a crystal substrate by applying an anisotropic etching process to said crystal substrate;

producing a die from said crystal substrate after said step of said anisotropic etching process by an electrocasting process; and forming said first and second substrates from said die by a resin molding process.

According to the present invention, one can mass-produce the first substrate and hence the optical module with low cost.

Another object of the present invention is to provide a compact optical module having an excellent performance of optical path conversion and excellent focusing of the optical beams.

Another object of the present invention is to provide an optical module, comprising:

one or more optical waveguide elements for guiding optical beams along a first optical path;

an optical path conversion device coupled to said one or more optical waveguide elements for converting an optical path of said optical beams from said first optical path to a second, different optical path;

said optical path conversion device comprising a substrate having an upper major surface and an end surface intersecting with each other, said substrate further having one or more grooves on an upper major surface thereof in correspondence to said one or more optical waveguides such that each of said grooves continues from said upper major surface to said end surface, said groove having a round bottom surface having a generally semicircular cross section and acting as a reflective surface, said groove thereby defining a round, generally semicircular cutout on said end surface of said substrate and another round, elongated cutout on said upper major surface of said substrate, each of said grooves having a depth, measured from said upper major surface, that increases toward said end surface; and one or more optical elements provided on said second optical path in correspondence to said elongated cutout on said upper major surface of said substrate for optical coupling with said one or more optical waveguide elements.

According to the present invention, one can not only convert the optical path from the first optical path to the second optical path but also converge the optical beam in the optical waveguide upon the corresponding optical element by way of the focusing action associated with the round bottom surface of the grooves. The optical module of the present invention has a compact, simple structure and can be easily manufactured with low cost.

In a preferred embodiment of the present invention, said optical module further includes a second substrate having an upper major surface for carrying both said optical waveguides and said optical elements thereon, said second substrate being mounted upon said first substrate forming said optical path conversion device, such that said upper major surface of said second substrate engages with said upper major surface of said first substrate, wherein said second substrate is formed with one or more positioning grooves on the upper major surface thereof for holding said one or more optical waveguides therein.

In a preferred embodiment of the present invention, each of said one or more grooves on said first substrate includes a positioning region at a part thereof adjacent to said end surface for positioning a corresponding optical waveguide therein.

Another object of the present invention is to provide an optical path conversion device for converting an optical path of an optical beam from a first optical path to a second, different optical path, comprising:

a substrate having an upper major surface and an end surface intersecting with each other;

a groove provided on an upper major surface of said substrate such that said groove continues from said upper major surface to said end surface, said groove having a round surface having a generally semicircular cross section and acting as a reflective surface, said groove thereby defining a round, generally semicircular cutout on said end surface of said substrate and another round, elongated cutout on said upper major surface on said substrate, each of said grooves having a depth, measured from said upper major surface, that increases toward said end surface.

According to the present invention, one can achieve the focusing of optical beam simultaneously to the conversion of the optical path on a reception device with a simple construction which is easy to fabricate.

Another object of the present invention is to provide a method of manufacturing an optical path conversion device, comprising the steps of:

forming a depression having a generally round shape on an end surface of a glass substrate, which is defined by a pair of major surfaces different from said end surface, by a photolithographic patterning process such that said round depression extends generally parallel to said pair of major surfaces with a diameter that decreases toward an interior of said glass substrate;

providing a reflective coating on a surface of said round depression; and dividing said glass substrate along a plane parallel with said pair of major surfaces so as to bisect said depression, said step of dividing thereby producing a pair of half bodies each carrying a groove corresponding to said depression on an upper major surface thereof such that said groove continues from said upper major surface to an end surface of said half body corresponding to said end surface of said glass substrate.

According to the present invention, one can fabricate an optical path conversion device having a curved reflective surface and capable of converging an optical beam simultaneously to a conversion of the optical path thereof, with a reduced fabrication cost.

Another object of the present invention is to provide a method of manufacturing an optical path conversion device, comprising the steps of:

forming a depression having a generally round shape on an end surface of a glass substrate defined by a pair of major surfaces different from said end surface by a photolithographic patterning process such that said round depression extends generally parallel to said pair of major surfaces with a diameter that decreases toward an interior of said glass substrate;

providing a reflective coating on a surface of said round depression;

dividing said glass substrate along a plane parallel with said pair of major surfaces so as to bisect said depression, said step of dividing thereby producing a pair of half bodies each carrying a groove corresponding to said depression on an upper major surface thereof such that said groove continues from said upper major surface to an end surface of said half body corresponding to said end surface of said glass substrate;

producing a die from said half body formed with said groove by an electrocasting process;

molding a resin in said die for producing a resin substrate such that said resin substrate has a groove corresponding in shape and size with said groove formed on said half body, on an upper major surface of said resin substrate; and providing a reflective coating on said round surface of said groove formed on said resin substrate.

According to the present invention, one can mass-produce said optical path conversion device with low fabrication cost.

In a preferred embodiment of the present invention, said step of providing a reflective coating comprises a step of providing multilayer films.

Another object of the present invention is to provide an optical module, comprising:

one or more optical fibers for guiding optical beams;

an optical connector element having a principal surface on which one or more grooves are formed for holding said one or more optical fibers therein, each of said grooves having a reflective surface at an end thereof for reflecting said optical beams in said optical fibers from a first path extending along said groove to a second, different path crossing said principal surface; and a device substrate having a principal surface on which one or more optical devices are carried in correspondence to said one or more optical fibers held on said optical connector element;

said optical connector element being mounted upon said device substrate such that said principal surface of said optical connector element contacts with said principal surface of said device substrate, said optical connector element being positioned on said principal surface of said device substrate such that said optical beams reflected by said reflective surfaces of said grooves couple with corresponding optical devices on said device substrate.

According to the present invention, one can achieve an efficient optical coupling between the optical beams in the optical fibers and the optical devices on the device substrate, by merely mounting the optical connector element on the principal surface of the device substrate and adjusting the relative positions of the optical connector element and the optical devices on the device substrate while using the principal surface of the device substrate as a guide surface. As the optical fibers are held within the grooves on the optical connector element, the optical fibers are positioned properly with respect to the reflective surfaces at the end of the grooves, and the need for adjusting the position of the optical fibers with respect to the reflective surfaces is eliminated.

In a preferred embodiment of the present invention, said optical connector element comprises a crystal substrate having a predetermined crystal orientation for said principal surface, wherein said grooves on said crystal substrate and said reflective surfaces are defined by respective crystal surfaces. According to the present invention, said grooves including said reflective surfaces are formed by a photolithographic patterning process with a high precision comparable to the patterning used for fabrication of semiconductor integrated circuits. Further, one can form the reflective surfaces with an exact orientation by an anisotropic etching process that causes a development of crystal surfaces suitable for reflective surface.

In another preferred embodiment of the present invention, said device substrate comprises a crystal substrate having a predetermined crystal orientation for said principal surface, wherein said device substrate carries one or more grooves corresponding to said one or more grooves on said principal surface of said optical connector element, on said principal surface of said crystal substrate. According to the present invention, the optical fibers held in the grooves on the optical connector element, are held also in the corresponding grooves on the crystal substrate forming the device substrate. Thereby, the alignment between the optical connector element and the device substrate is achieved by way of the optical fibers by simply mounting the optical connector element on the device substrate.

In another preferred embodiment of the present invention, said device substrate carries a multilayer film on said principal surface for filtering the optical beam passing therethrough. According to the present invention, one can provide an optical filter to each of the optical devices on the device substrate such that the optical filter filters the optical beam exchanged between the optical fiber and the optical device.

In another preferred embodiment of the present invention, each of said grooves on said optical connector element is filled by a transparent adhesive in correspondence to a part located between an end of said optical fiber and said reflective surface, said adhesive having a refractive index substantially identical with a refractive index of a core of said optical fiber. According to the present invention, one can improve the efficiency of optical coupling between the optical fiber and the corresponding optical device.

In another preferred embodiment of the present invention, each of said optical fibers has a lens at an end thereof such that said end of said optical fiber faces said reflective surface in said groove. According to the present invention as set forth above, one can minimize the divergence of the optical beam emitted at the foregoing end, and the efficiency of optical coupling between the optical fibers in the grooves and the corresponding optical devices is improved.

Another object of the present invention is to provide a method of manufacturing an optical path conversion device, comprising the steps of:

forming a depression having a round shape on an end surface of a glass substrate defined by a pair of major surfaces different from said end surface by a photolithographic patterning process, such that said round depression extends generally parallel to said pair of major surfaces with a diameter that decreases toward an interior of said glass substrate;

producing a die from said glass substrate formed with said depression by an electrocasting process;

molding a resin in said die for producing a resin substrate such that said resin substrate carries a depression corresponding in shape and size with said depression on said glass substrate, on an end surface of said resin substrate corresponding to said end surface of said glass substrate; and providing a reflective coating on said round surface of said depression formed on said end surface of said resin substrate; and dividing said resin substrate along a plane substantially perpendicular to said end surface of said resin substrate so as to bisect said depression, said step of dividing thereby producing a pair of half bodies each carrying a groove corresponding to said depression on a major surface thereof such that said groove continues from said major surface to an end surface of said half body corresponding to said end surface of said resin substrate. According to the present invention, it is possible to mass produce the resin package body formed with round depressions on the end surface of the resin package body. By dividing the resin package body thus obtained such that the depressions on the end surface are bisected, it is possible to fabricate the optical path conversion device having the preferable feature of optical focusing upon the optical path conversion, efficiently and with low fabrication cost.

Other objects and further features of the present invention will become apparent from the following detailed description when read in conjunction with the attached drawings.

BRIEF DESCRIPTION OF THE DRAWINGS

FIG. 1 is a diagram showing the construction of a conventional optical module;

FIGS. 2A and 2B are diagrams showing the construction of another conventional optical module;

FIGS. 5A–5C and FIGS. 6A–6C are diagrams showing the construction of an optical module according to a third embodiment of the present invention;

FIGS. 13A and 13B are diagrams showing an optical module according to a tenth embodiment of the present invention;

FIGS. 14A–14F are diagrams showing the fabrication process of the optical module of the tenth embodiment;

DETAILED DESCRIPTION OF PREFERRED EMBODIMENTS

Figure 3:
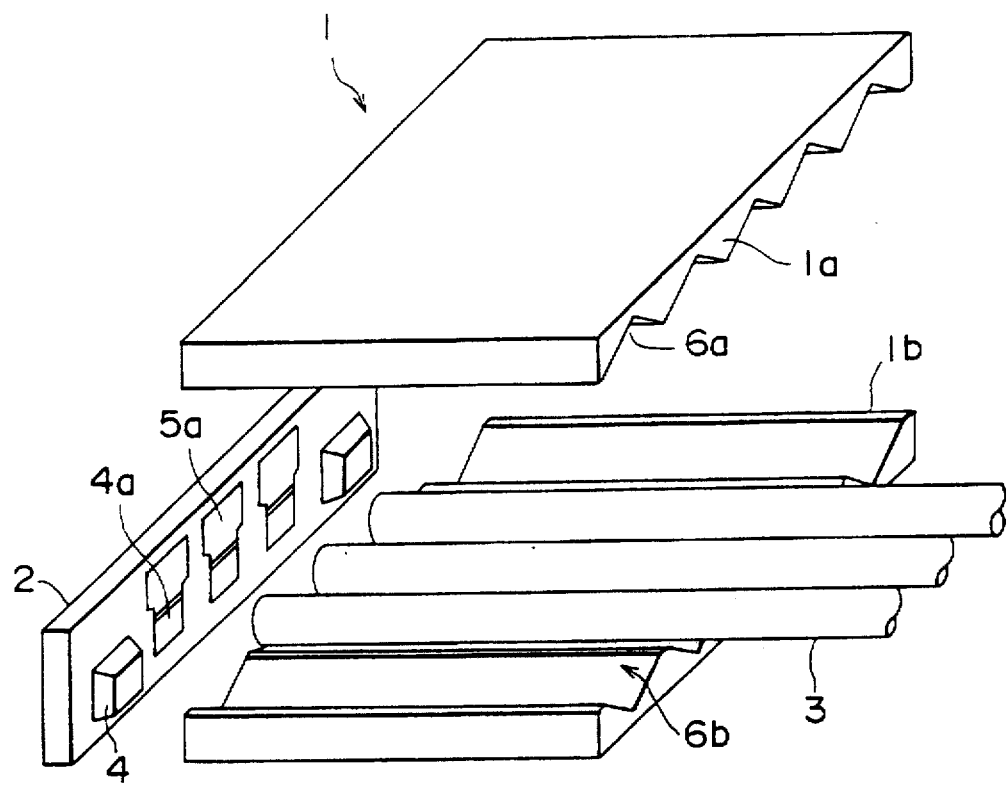
FIG. 3 is a diagram showing the construction of an optical module according to a first embodiment of the present invention in an exploded view.

FIG. 3 shows the construction of an optical reception module according to a first embodiment of the present invention.

Referring to FIG. 3, the optical reception module includes first and second substrates 1a and 1b forming together an optical connector 1 that holds a plurality of optical fibers 3, wherein it will be noted that each of the substrates 1a and 1b has an upper major surface provided with grooves 6a or 6b extending parallel with each other at respective positions on the substrate. The grooves 6a or 6b are repeated with a predetermined pitch and define a space for holding the optical fibers 3 when the substrates 1a and 1b are assembled to form the optical connector 1 such that the upper major surface of the substrate 1a faces the upper major surface of the substrate 1b. The substrates 1a and 1b may be formed of a single crystal substrate of a commonly used material such as silicon, and the grooves 6a or 6b may be formed by an anisotropic etching process applied to the upper major surfaces of the substrates 1a and 1b. In this case, each of the grooves 6a and 6b is defined by a pair of crystal surfaces.

Further, the optical reception module of FIG. 3 includes a device substrate 2 having an upper major surface on which a plurality of photodiodes 4a are provided in the form of a monolithic integrated circuit, together with corresponding electrodes 5a. In addition, the device substrate 2 is formed with two or more polygonal projections 4 at respective predetermined positions determined with respect to the photodiodes 4a. In the illustrated example, each of the polygonal projections 4 has a trapezoidal shape having a base area and a top face having an area smaller than the base area.

As noted already, the optical fibers 3 are held in corresponding spaces formed by the grooves 6a and 6b, wherein the device substrate 2 is provided on an end surface of the substrates 1a and 1b forming the optical connector such that the upper major surface of the device substrate 2 faces the end surfaces of the substrates 1a and 1b. Thereby, the optical fibers 3 held in the spaces thus formed by the grooves 6a and 6b extend toward the device substrate 2 such that the end surfaces of the optical fibers 3 face corresponding photodiodes 4a on the substrate 2. Further, the spaces thus formed and corresponding to the polygonal projections 4 are left unoccupied by the optical fibers 3. Thus, the polygonal projections 4 engage with the corresponding spaces when the device substrate 2 is mounted upon the optical connector 1 formed by the substrates 1a and 1b, and an excellent alignment between the photodiodes on the substrate 2 and the optical fibers 3 is achieved substantially automatically upon the mounting of the device substrate 2 upon the optical connector 1. The substrates 1a and 1b thus mounted upon the substrate 2 are then fixed thereto by means of an adhesive.

It should be noted that the optical reception connector of FIG. 1 not only achieves the self-optical alignment of the optical fibers 3 against the photodiodes 4a on the substrate 2 upon assembling of the module but also other various advantageous features such as small size and easy construction associated with reduced number of parts, and precise optical alignment in the order of microns achieved by the use of microfabrication technology, used commonly for fabrication of semiconductor devices and integrated circuits, for the formation of the projections 4 as well as mating grooves 6a and 6b.

Figure 4A:
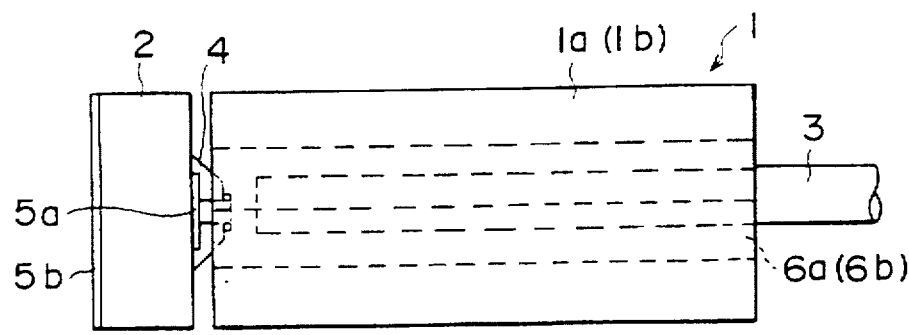
FIGS. 4A–4C are diagrams showing the construction of an optical module according to a second embodiment of the present invention.
Figure 4B:
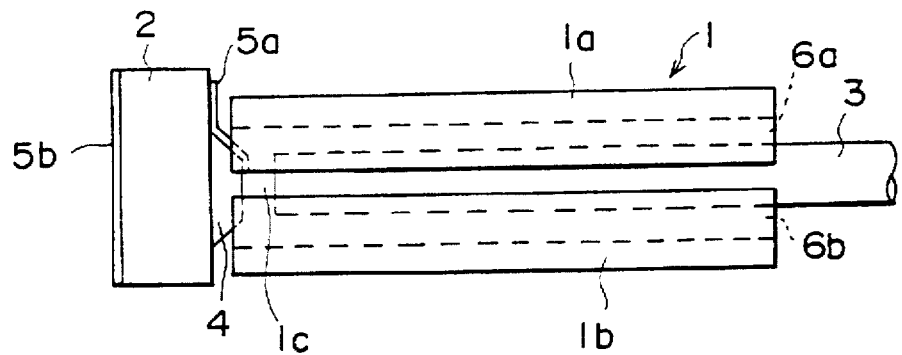
Figure 4C:
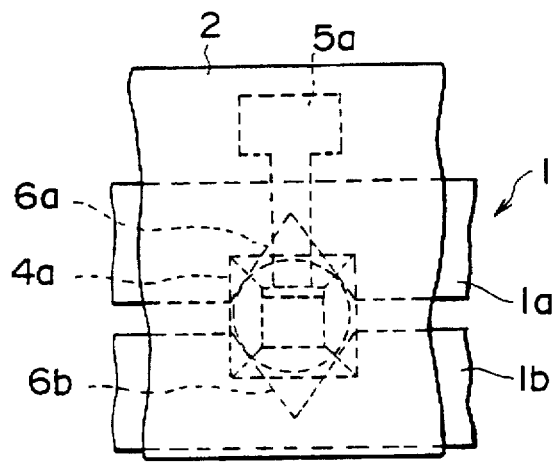

FIGS. 4A–4C show an optical reception module according to a second embodiment of the present invention, wherein FIG. 4A shows the optical reception module in a plan view, FIG. 4B shows the optical reception module in a side view, and FIG. 4C shows the optical reception module in an end view as viewed from the left direction of FIG. 4B. As will be noted from FIGS. 4A–4C, the optical reception module of the present invention includes only one, single optical fiber. However, this feature is by no means essential to the present embodiment.

Referring to FIGS. 4A–4C, it will be noted that the device substrate 2 carries a photodiode 4a in correspondence to the polygonal projection 4. In other words, there is provided a mesa structure on the upper major surface of the substrate 2 acting also as the polygonal projection 4 of the previous embodiment, and the photodiode 4a is provided on such a mesa structure. Thus, the electrode 5a extends along the oblique surface of the mesa structure as can be seen clearly in FIGS. 4A and 4B. In addition FIGS. 4A and 4B show a back side electrode 5b provided on the opposite, lower major surface of the substrate 2.

In the present embodiment, too, the substrates 1a and 1b are assembled to hold the optical fiber 3 in the space formed between the grooves 6a and 6b as indicated in FIG. 4C, wherein the optical connector 1 thus formed is mounted upon the device substrate 2 such that the mesa 4 engages with the space formed by the substrates 1a and 1b at the end of the optical connector 1. Thereby, the optical fiber 3 has an end slightly retracted from the end surfaces of the substrates 1a and 1b with an amount corresponding to the height of the mesa 4. Thus, no collision occurs between the end of the optical fiber and the photodiode on the mesa 4 even when the substrates 1a and 1b are assembled upon the device substrate 2 to form the optical reception module. The optical reception module of the present embodiment achieves a self-optical alignment upon the assembling of the device similarly to the optical reception module of the first embodiment.

Next, a fabrication process of the optical reception module of the present invention will be described with reference to FIGS. 5A–5C showing a third embodiment of the present invention, wherein FIGS. 5A–5C show the fabrication process of the device substrate 2.

Referring to FIG. 5A, an n-type silicon substrate having an (100)-oriented upper major surface is used for the device substrate 2. In the step of FIG. 5A, a resist layer is provided on the upper major surface of the substrate 2, followed by a photolithographic patterning process for forming an opening in the mask for selectively exposing the upper major surface of the substrate 2. Further, an ion implantation process of boron is conducted to such an exposed supper major surface of the substrate 1. After the ion implantation, an annealing process is conducted to form a p-type diffusion region 7 bounded by a p-n junction as indicated in FIG. 5A. The p-n Junction thus formed forms the active part of the photodiode 4a to be formed on the device substrate 2.

After the formation of the diffusion region 7, the resist layer is removed, and the upper major surface the substrate 2 is covered by a silicon oxide film by way of an oxidation conducted in a wet oxygen environment Further, the silicon oxide film thus formed is subjected to a photolithographic patterning process to form a rectangular mask defined by an edge extending in the <110> direction, and the exposed surface of the silicon substrate 2 is subjected to an anisotropic etching process using an aqueous solution of KOH or EPW (ethylendiamine pyrocatechol) as an etchant. As a result, the foregoing mesas 4 are formed with a height of typically several microns as indicated in FIG. 5B. It should be noted that the illustrated example includes a plurality of mesas 4 in correspondence to the diffusion regions 7 and hence in correspondence to the photodiodes 4a.

Further, in the step of FIG. 5C, the electrode 5a is formed on each of the mesas 4 by a deposition of a metal layer, followed by a patterning process that may include a lift off process. After depositing the back side electrode 5b on the lower major surface of the substrate 2, one obtains a plurality of photodiodes 4a aligned on the device substrate 2 in correspondence to the mesas 4. In the present embodiment, at least two of such mesas 4 are used for the positioning projection for the optical alignment between the device substrates 2 and hence the photodiodes thereon and the optical fibers 3 on the substrates 1a and 1b.

It should be noted the positioning projections 4 thus formed has a base area larger than the area of the top face. Thus, the projections 4 engage with the corresponding spaces on the optical connector 1 even there is an error in the size of the projections or in the size of the grooves 6a and 6b. In fact, such an error is extremely small in the device of the present invention due to the foregoing photolithographic patterning process that is employed commonly for the fabrication of miniature patterns of semiconductor integrated circuits. Associated with the high precision formation of the mesas 4, the mesas 4 are also formed with high precision with respect to the mutual positional relationship.

FIGS. 6A–6B show various examples of the optical connector 1, wherein FIG. 6A shows an example wherein the optical fiber 3 has a flat end at the side facing the photodiodes on the device substrate 2, while FIG. 6B shows an example wherein the optical fiber 3 has a rounded end. In the example of FIG. 6B, an optical fiber 3a having a rounded end is held by the substrates 1a and 1b, wherein the rounded end of the optical fiber 3a acts as a lens for focusing the optical beam transmitted through the optical fiber 3 on the corresponding photodiode 4a.

FIG. 6C shows the end view of any of the constructions of FIGS. 6A and 6B, wherein it will be noted that the optical fibers 3 or 3a are held by the V-shaped grooves 6a or 6b. In FIG. 6C, the illustration of the substrate 1a is omitted for the sake of simplicity. Thus, the optical fibers 3 or 3a are held by the substrates 1a and 1b, and the fibers 3 or 3a are fixed upon the substrates 1a and 1b by way of an adhesive. Thereby, the end of the optical fibers 3 or 3a may be retracted slightly from the end surface of the substrates 1a and 1b with an amount corresponding to the height of the projections 4, as already described, such that there is formed a space at the end of the optical connector 1 for accepting the projections 4.

The optical connector 1 thus mounted upon the substrate 2, with the engagement of the projections 4 with the corresponding spaces in the optical connector 1, is then fixed thereon by an adhesive in the state that the optical axes of the optical fibers 3 intersect the upper major surface of the device substrate 2 substantially perpendicularly. Thereby, the optical alignment of the device is achieved without additional fine adjustment process. This feature is particularly advantageous for coupling a large number of optical fibers forming an optical fiber array to a corresponding photodiode array.

It should be noted that the present invention is by no means limited to the construction of using the n-type silicon substrate having the (100)-oriented surface for the device substrate 2. For example, one may deposit a low impurity silicon film on the n-type silicon substrate 2 to form a pin photodiode. Further, one may employ an InP substrate covered by a GaInAsP film for the substrate 2 when transmitting optical beams having a wavelength exceeding 1 μm. In this case, too, it is possible to form the mesas by means of wet etching process or dry etching process such as RIE.

Further, one may fabricate the substrates 1a and 1b having the grooves 6a and 6b by the well known stamping process, in which a semiconductor master carrying grooves corresponding to the grooves 6a or 6b is covered by a metal layer according to an electrocasting process to form a stamper. The substrates 1a or 1b are then formed by molding a resin by the stamper thus formed. The resin may be a low shrinkage resin that cures upon heating or ultraviolet radiation. Further, the molding process may be an injection molding process.

Further, one may provide the rounding of the end of the optical fibers 3 by causing a melting by a flame. Alternatively, such a rounding may be achieved by a chemical etching process. As already noted, such a rounded edge of the optical fiber is suitable for causing the focusing of the optical beam in the optical fiber 3 upon the corresponding photodiode on the device substrate 2. Further, one may fill the space, designated by a numeral 1c in FIG. 4B, between the end of the optical fiber 3 and the photodiode 4a by a resin having a refractive index identical with the refractive index of the core of the optical fiber. Thereby, the optical coupling between the optical fiber 3 and the photodiode 4a is substantially improved.

It should be noted that, in any of the preceding embodiments, the optical semiconductor device 4a is not limited to a photodiode but may be a planar laser diode or other optical semiconductor device such as a light emitting diode.

Next, a fourth embodiment of the present invention will be described with reference to FIG. 7.

Figure 7:
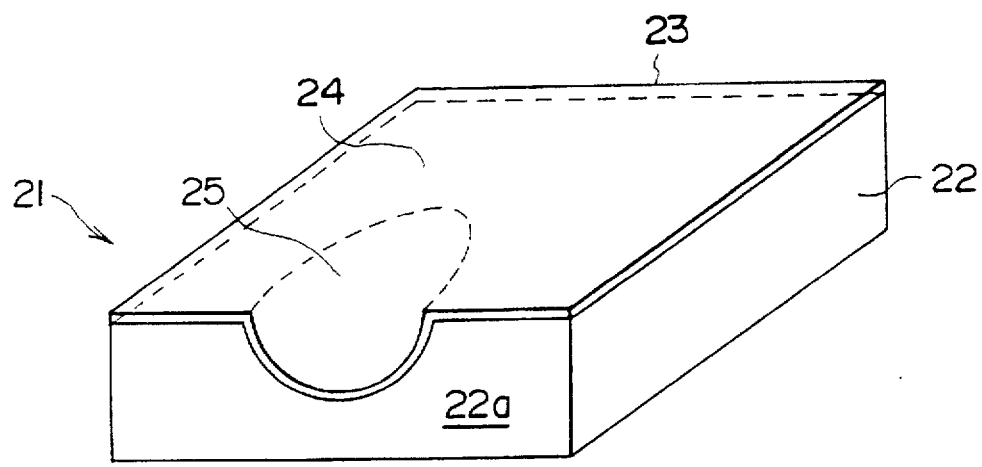
FIG. 7 is a diagram showing the construction of an optical module according to a fourth embodiment of the present invention.

Referring to FIG. 7 showing an optical-path conversion device for optical path conversion, the device includes a glass substrate 22 having a flat upper major surface. The glass substrate 22 is formed with a groove 25 having a curved bottom surface on the upper major surface such that the groove 25 extends from the upper major surface to an end surface 22a of the substrate 22. Thus, the groove 25 has a depth, measured from the upper major surface of the substrate 22, that increases toward the end surface 22a, and accordingly shows a round, semi-circular cross sectional shape at the end surface 22a of the substrate 22. Further, the groove 25 shows an elongated semi-circular cross sectional shape on the upper major surface of the substrate 22. Further, the substrate 22 is covered, including the groove 25, by a reflective coating 24 such that the optical beam incident to the device 21 toward the end surface 22a along a first optical path, is reflected in the upward direction to a second optical path by the groove 25, with a focusing action provided by the curvature of the round groove surface.

Figure 8A:
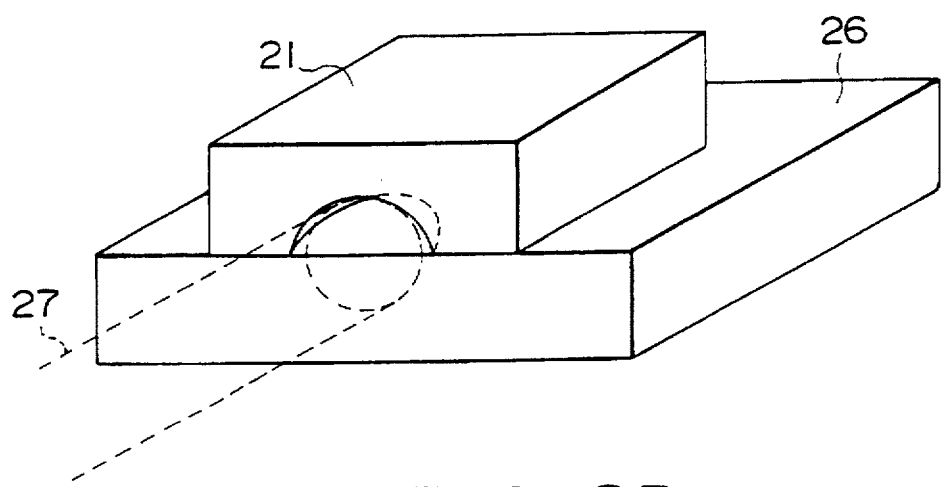
FIGS. 8A and 8B are diagrams showing the construction of an optical module according to a fifth embodiment of the present invention.
Figure 8B:
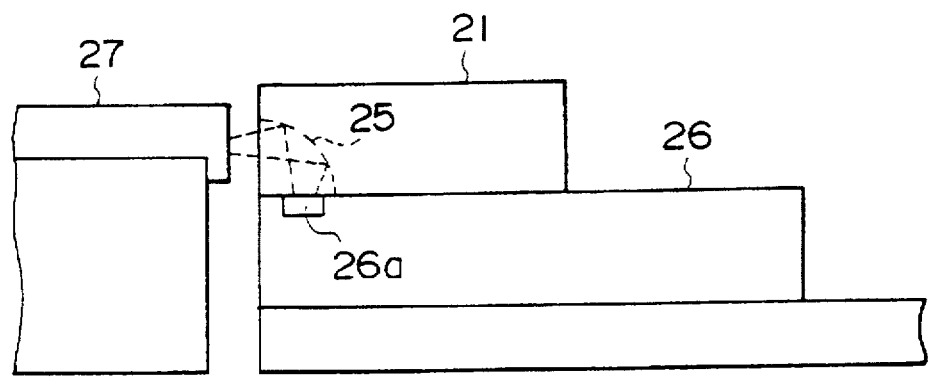

FIGS. 8A and 8B show the construction of an optical module according to a fifth embodiment of the invention in which the optical path conversion device 21 of FIG. 7 is used.

Referring to FIGS. 8A and 8B, the optical module includes a substrate 26 carrying an optical semiconductor device 26a such as a photodiode or laser diode on an upper major surface thereof as indicated in FIG. 8B, and the optical path conversion device 21 is provided such that the upper major surface of the substrate 22 forming the device 21 engages with an upper major surface of the substrate 26. Further, there is provided an optical fiber 27 or other suitable optical waveguide such that the optical fiber 27 emits an optical beam to the device 21 as indicated in FIG. 8B such that the optical beam is directed to the groove 25 via the semi-circular cutout on the edge surface 22a and reflected in the upward direction (downward direction in FIG. 8B: the optical path conversion device 21 is provided on the substrate 26 upside down) toward the optical semiconductor device.

By providing the optical semiconductor device 26a in a plurality of numbers to form an array on the substrate 26 and by providing the groove 25 to form a corresponding array of grooves on the substrate 22, one can achieve an efficient optical coupling between the optical semiconductor devices 26a and corresponding optical fibers 27.

FIGS. 9A–9E are diagrams showing the fabrication process of optical path conversion device 21 according to a sixth embodiment of the present invention, wherein the device 21 differs from the device of FIG. 7 only in the point that there are plurality of grooves formed parallel on the upper major surface of the substrate 22.

Figures 9A, 9B, 9C:
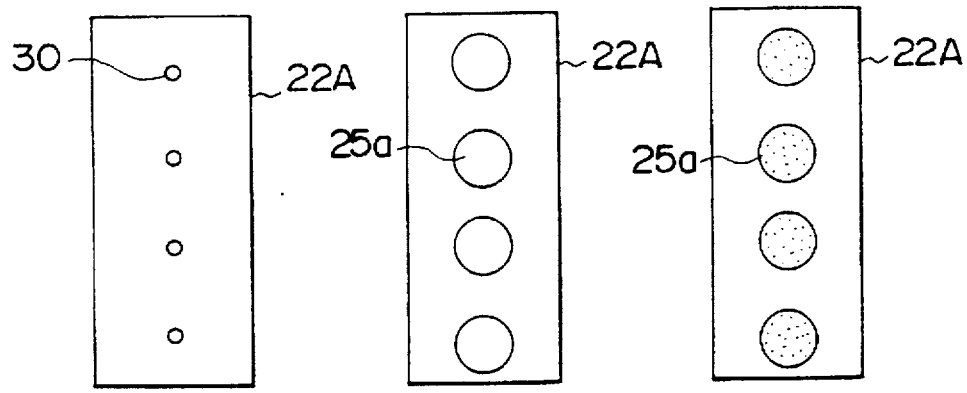
FIGS. 9A–9E are diagrams showing the fabrication process of an optical module according to a sixth embodiment of the present invention.

Referring to FIG. 9A, a resist layer is provided on an end surface of a glass substrate 22A, followed by a photolithographic patterning process to form a plurality of generally circular openings 30 in correspondence to the location in which the grooves 25 are to be formed. Next, a wet etching process is applied to the exposed end surface of the glass substrate 22A while using the patterned resist as a mask. Typically, hydrofluoric acid or buffered hydrofluoric acid is used as an etchant. As a result, a number of circular depressions 25a are formed on the end surface as indicated in FIG. 9B, with a radius typically of several hundred microns. After the step of FIG. 9B, the resist is removed, and a reflective coating of reflective metals such as aluminum or silver is applied on the end surface such that the reflective coating covers the surface of the depressions 25a as indicated in FIG. 9C. Further, an insulating coating of silicon oxide is deposited on the surface of the depressions 25a.

Figures 9D, 9E:
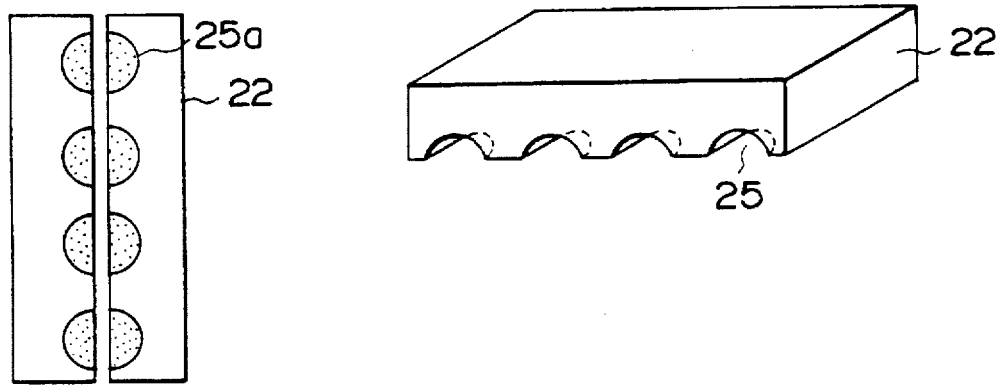

After the step of FIG. 9C, the substrate 22A is divided into two pieces as indicated in FIG. 9D along a plane bisecting each of the depressions 25a. Each of the half-bodies thus obtained then forms the optical path conversion device of FIG. 7 as indicated in FIG. 9E except for the reflective coating covering the upper major surface of the substrate 22. Of course, one may provide the reflective coating 24 of FIG. 7 and the insulating coating thereon after the step of FIG. 9D.

Next, a seventh embodiment of the present invention will be described with reference to FIGS. 10A and 10B.

Figure 10A:
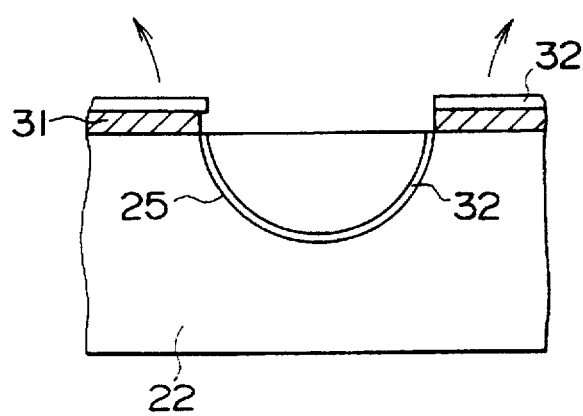
FIGS. 10A and 10B are diagrams showing the fabrication process of an optical module according to a seventh embodiment of the present invention.

Referring to FIG. 10A, a resist layer 31 is first provided on the surface of the substrate 22 except for the groove 25 by a photolithographic patterning process, and a metal layer 32 is deposited subsequently such that the metal layer 32 covers the exposed surface of the groove 25 as a reflective coating. Further, the metal layer 32 is lifted off together with the resist layer 31. Alternatively, one may apply a resist on the end surface of the substrate 22A of FIG. 9B except for the depressions 25a, and deposit a metal film on the exposed surface of the depressions 25a. Thereby, the metal film covering the end surface is lifted off together with the resist layer. The substrate 22A thus formed is then divided in the step of FIG. 9D.

Figure 10B:
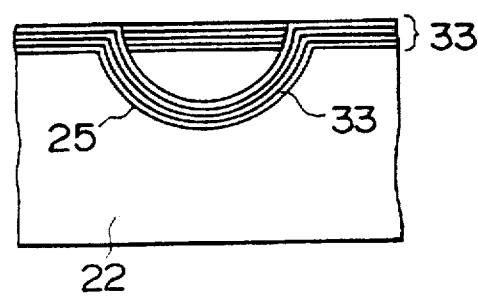

FIG. 10B shows a modification of the present embodiment showing an example of providing a multilayer film 33 on the surface of the groove 25 to form the reflective coating.

Referring to FIG. 10B, the multilayer film 33 consists of an alternating and repetitive stacking of a first transparent film such as $TiO_2$ having a first refractive index and a second transparent film such as $SiO_2$ having a second refractive index, wherein the thickness of the first transparent film and the thickness of the second transparent film are set equal to one-quarter the wavelength of the optical beam to be reflected. Thereby, such a multilayer film acts as a mirror having a high selectivity to the wavelength of the optical beam.

Further, one may form the grooves 25 in the substrate 22 to have a round, but non-circular cross section by providing a suitable shape to the patterns 30 in the step of FIG. 9A.

Figure 11:
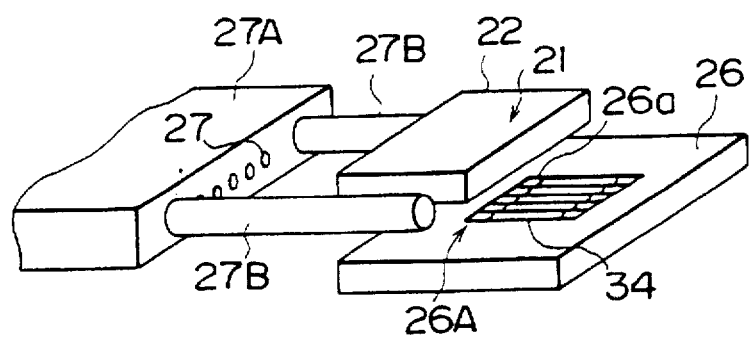
FIG. 11 is a diagram showing the construction of an optical module according to an eighth embodiment of the present invention.

FIGS. 11 shows an optical reception module according to an eighth embodiment that uses the optical path conversion device 21 described heretofore.

Referring to FIG. 11A showing an optical module for coupling the optical fibers 27 in an optical fiber array 27A to the photodiodes 26a forming a photodiode array by way of the device 21, the device 21 is placed on the upper major surface of the substrate 26 that carries thereon an electrode pattern 34, such that the lower major surface of the substrate 22 (upper major surface in the state of FIG. 7) forming the device 21 contacts with the upper major surface of the substrate 26, and the optical fiber array 27A is mounted upon the substrate 26 such that each of the optical fibers 27 in the array 27A aligns with a corresponding groove 25 on the optical path conversion device 21. In order to achieve the alignment, the optical fiber array 27A includes a pair of positioning pins 27B extending parallel with each other in the direction of the optical beams emitted from the optical fibers 27, such that the positioning pins 27B are disposed with a mutual separation corresponding to the width of the substrate 22 forming the optical path conversion device 21. Thus, the positioning pins 27B engage with the side walls of the substrate 22 and the optical fibers 27 in the optical fiber array 27A are positioned with respect to the corresponding grooves on the device 21. It should be noted that the optical fibers 27 are disposed in the optical fiber array 27A with a pitch identical with the pitch of the grooves 25 in the device 21. Thus, the restriction of position of the optical fiber array 27A with respect to the substrate 22 of the optical path conversion device 21 by way of the positioning pins 27 is sufficient for achieving the desired alignment between the optical fibers 27 in the array 27A and the grooves 25 in the device 21.

It should be noted that the construction of FIG. 11 is not only effective for the optical reception modules including a photodiode array 26A but also for other optical devices that use a laser diode array or photodiode array. It should be noted that the distance between the optical fiber array 27A and the device 21 is determined based upon various factors such as the radius of curvature of the grooves 25, the numerical aperture of the optical fibers 27, the photoreception area of the photodiode 26a, and the like.

Figure 12B:
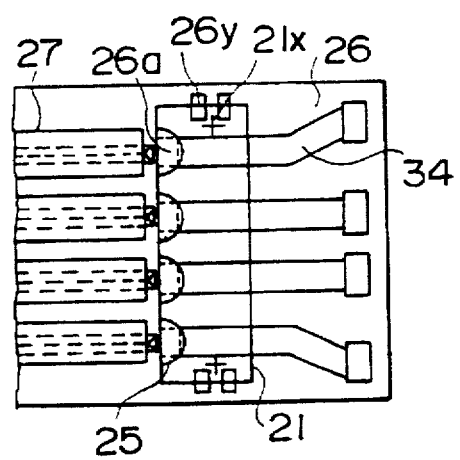
FIGS. 12A–12D are diagrams showing the construction of an optical module according to a ninth embodiment of the present invention.
Figure 12A:
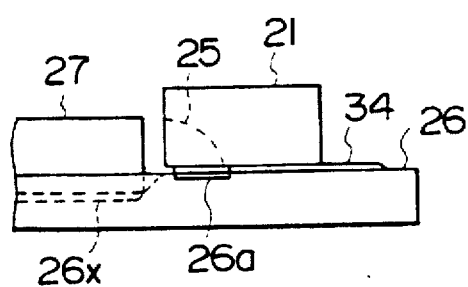

FIGS. 12A and 12B show a ninth embodiment of the present invention showing an optical reception module that uses the optical path conversion device 21 described heretofore, wherein FIG. 12A shows the optical module in a side view while FIG. 12B shows the optical module in a plan view.

Referring to FIGS. 12A and 12B, it will be noted that the substrate 26 has positioning grooves 26x on the upper major surface thereof such that the positioning grooves 26x are disposed with a pitch corresponding to the pitch of the grooves in the device 21, and optical fibers 27 are held in the corresponding grooves 26x as indicated in FIG. 12A. Further, the substrate 26 carries an alignment mark 26y on the upper major surface thereof for determining the position of the optical path conversion device 21 on the substrate 26. In correspondence to the alignment mark 26y, the device 21 also carries an alignment mark 21x on the upper major surface of the substrate 22 that contacts the upper major surface of the substrate 26 in the state of FIGS. 12A and 12B. It should be noted that the substrate 22 is formed of a transparent glass plate and the recognition of the alignment marks 21x and 26y through the substrate 22 is achieved without problem. Further, the alignment process using the alignment marks 21x and 26y is effective also for establishing optical alignment between the grooves 25 in the optical path conversion device 21 and optical waveguides provided on the upper major surface of the substrate in place of the optical fibers 27.

Figure 12C:
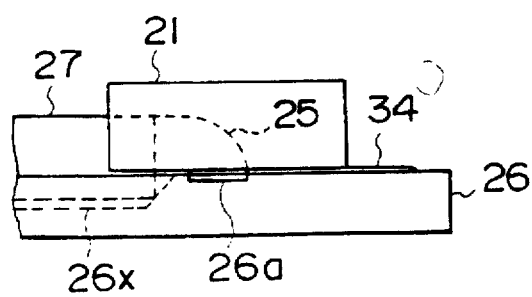
Figure 12D:
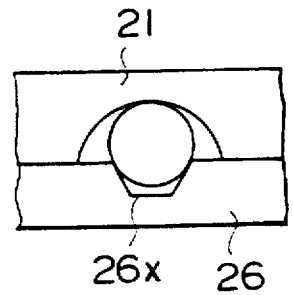

FIGS. 12C and 12D show a modification of the present embodiment, wherein the groove 25 is formed in the substrate 22 to extend further such that the optical fiber 27 held in the groove 26x on the substrate 26 is accommodated in the groove 25. It should be noted that FIG. 12C shows a side view of the optical module of the present modification while FIG. 12D shows a cross sectional view of the structure of FIG. 12C. Thereby, the alignment of the device 21 with respect to the optical fibers 27 and the photodiodes 26a on the substrate 26 is achieved by merely mounting the optical path conversion device 21 on the substrate 26, without using additional alignment marks.

It should be noted that the material for the substrate 22 is not limited to glass but one may use various semiconductor crystals such as silicon, GaAs, InP, and the like. Further, one may use laser diodes or light emitting diodes in place of the photodiode 26a as already mentioned. Alternatively, one may form the substrate 22 by a stamping process that uses a master formed from a glass substrate processed by the process described heretofore. In this process, a metal stamper is formed from the master by applying an electrocasting process thereto, and the substrate 22 is formed by a resin molding process while using the stamper as a die. Alternatively, one may employ an injection molding process. Thereby, it is possible to mass produce the optical path conversion device 21 with a low fabrication cost.

FIGS. 13A and 13B show an optical module 61 according to a tenth embodiment of the present invention, wherein FIG. 13A shows the optical module in a plan view while FIG. 13B shows a plan view.

Referring to FIGS. 13A and 13B, the optical module 61 includes an optical connector element 62 carrying one or more optical fibers 64 thereon and a device substrate 63 for carrying one or more optical devices 67 on a principal surface 63a thereof in correspondence to the optical fibers 64 on the optical connector element 62, wherein the optical connector element 62 includes one or more grooves 65 formed on a principal surface 62a thereof for holding the optical fibers 64 therein.

Each of the grooves 65 has an oblique end surface 66 defined by a crystal surface, and the end surface 66 reflects the optical beam emitted from the optical fiber 64 in the groove 65 in a direction substantially perpendicular to the principal surface 62a of the optical connector element 62. Thereby, the optical path of the optical beam is converted from a first path parallel to the groove 65 to a second path substantially perpendicular to the principal surface 62a of the optical connector element 62. Thus, the optical beams reflected at the end surfaces 66 of the grooves 65 impinge upon the respective optical devices 67 such as photodiodes forming a photodiode array on the principal surface 63a of the device substrate 63, when the optical connector element 62 is mounted upon the device substrate 63 such that the principal surface 62a of the element 62 faces the principal surface 63a of the substrate 63. It should be noted that electrode patterns 68 extends from the photodiodes 67 on the principal surface 63a of the device substrate 63. As the optical fibers 64 are held at respective, predetermined positions in the optical connector element 62 in correspondence to the grooves 65, the alignment between the optical fibers 64 and the corresponding photodiodes 67 is achieved easily by merely adjusting the position of the optical connector element 62 on the device substrate 63 while maintaining an engagement between the optical connector element 62 and the device substrate 63. Similarly to the previous embodiments, the optical device 67 is by no means limited to photodiode but other optical devices such as laser diode or light emitting diode may be used as well.

FIGS. 14A–14F show the process for fabricating the optical module 61 of the present embodiment, wherein FIGS. 14A–14C show the process for fabricating the optical connector element 62 while FIGS. 14D–14F show the process for fabricating the device substrate 63.

Referring to FIG. 14A, a silicon oxide film 71 is formed on a (100)-oriented surface of an n-type silicon substrate that serves for the body of the optical connector element 62 by a thermal oxidation process conducted in an $H_2O$ environment, followed by a photolithographic patterning process to form mask openings 70 in the oxide film 71 in correspondence to the grooves 65 to be formed Thereby, the (100)-oriented surface of the silicon substrate coincides with the principal surface 62a of the element 62. Next, in a step of FIG. 14B, a wet etching process is applied to the exposed surface of the silicon substrate to form the grooves 65 in correspondence to the mask openings 70 while using the patterned silicon oxide film 71 as a mask. The etching is typically conducted by using an etchant such as KOH or EPW similarly to the previous embodiments, and the etching process results in an anisotropic etching effect that results in a characteristic development of predetermined crystal surfaces having characteristically small etching rate. As a result, the groove 65 is defined by a pair of crystal surfaces defining a V-shaped cross section. Further, the end surface 66 acting as the reflection surface shows a characteristic angle of 54.7° with respect to the principal surface 62a of the silicon substrate in correspondence to the (111) surface. Further, the silicon substrate thus processed is applied with a deposition of Au in the step of FIG. 14C to form a reflective coating 72 on the surface of the grooves 65 including the end surface 66, followed by a sputter deposition of a silicon oxide film for electric insulation.

On the other hand, the device substrate 63 is prepared as follows.

In a step of FIG. 14D, a silicon oxide film is deposited on an n-type silicon substrate forming the body of the device substrate 63 by a thermal oxidation process conducted in a H₂O environment, followed by a photolithographic patterning process to form generally square mask openings in the silicon oxide film in correspondence to the photodiodes 67 to be formed. Next, while using the patterned silicon oxide film as a mask, an ion implantation of boron is conducted through the mask openings thus formed upon the principal surface 63a of the silicon substrate 63 to form p-type diffusion regions. Thereby, the p-n junctions formed around the p-type diffusion regions act as the active region of the photodiode 67. Further, the electrode patterns 68 are formed on the principal surface 63a of the device substrate 63 thus formed in a step of FIG. 14E.

Further, one may provide grooves 69 on the principal surface 63a in correspondence to the grooves 65 on the optical connector element 62 by way of photolithographic patterning process as indicated in FIG. 14F. By providing the grooves 69 in correspondence to the grooves 65, one can hold the optical fibers 64 with an excellent alignment with respect to the photodiodes 67 on the substrate 63, and the alignment between the optical connector element 62 and the device substrate 63 is achieved by merely mounting the optical connector element 62 upon the device substrate 63 such that the grooves 65 on the element 62 encages with the optical fibers 67 held in the grooves 69 on the substrate 63. Thereby, one can even eliminate the process for adjusting the position of the optical connector element 62 on the device substrate 63 for seeking the optimum, aligned position. Once the alignment is achieved, the optical fibers 64, the optical connector element 62 and the device substrate 63 are bonded with each other by an adhesive.

Figure 15A:
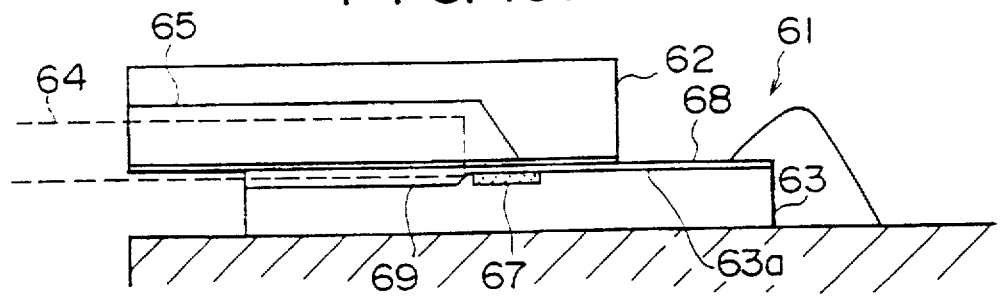
FIGS. 15A and 15B are diagrams showing the optical module according to an eleventh embodiment of the present invention.
Figure 15B:
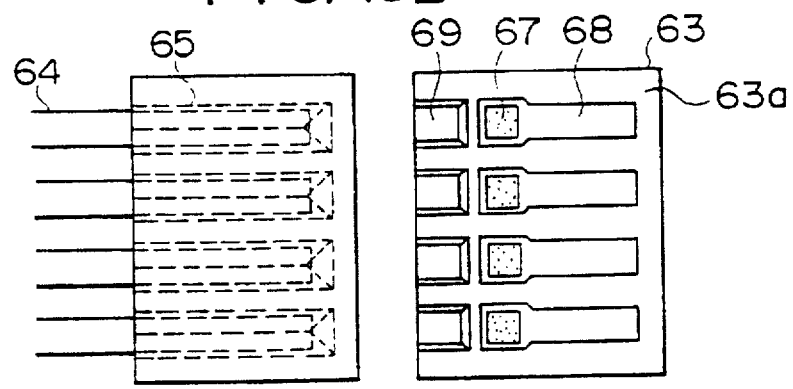

FIGS. 15A and 15B show an optical module according to an eleventh embodiment of the present invention, wherein FIG. 15A shows a side view while FIG. 15B shows a plan view. It will be noted that the optical module of the present embodiment includes the grooves 69 provided on the principal surface 63a of the device substrate 63 and hence corresponds to the structure of FIG. 14F described previously as an optional process. As the grooves 69 on the substrate 63 cooperate with the grooves 65 on the optical connector element 62, the device of the present embodiment has an advantageous feature of the simple alignment process described already with reference to FIG. 14F.

Figure 16A:
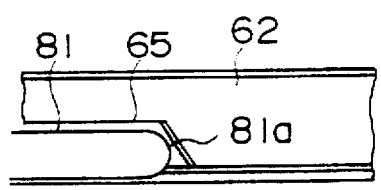
FIGS. 16A–16D are diagrams showing further embodiments of the optical module according to the present invention.

FIGS. 16A–16D show various other embodiments of the present invention, wherein FIG. 16A shows a case in which a lens 81a is provided on an end of an optical fiber 82 that engages with the groove 65 of the optical connector element 62. As a result of the focusing action of the lens 81a, the optical beam emitted from the optical fiber 81 is effectively focused upon the corresponding photodiode 67 on the device substrate 63. It should be noted that such a lens 81a can be easily formed by melting the end of the optical fiber 81 in a flame.

Figure 16B:
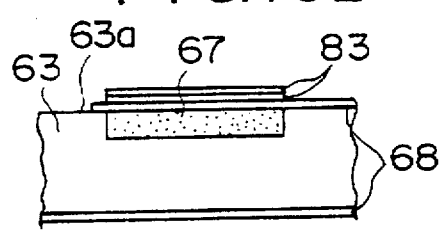

FIG. 16B shows an embodiment in which a multilayer film 83 is provided on the principal surface 63a of the device substrate 63 in correspondence to the photodiode 67. The multilayer film 83 is formed of an alternate repetition of a SiO₂ film and a TiO₂ film each having a quarter wavelength of the optical beam, similarly to the embodiment of FIG. 10B described previously, and acts as an optical filter having a high wavelength selectivity. By providing such a multilayer film 83 in correspondence to the photodiode 67, one can provide a low noise, reliable optical module.

Figure 16C:
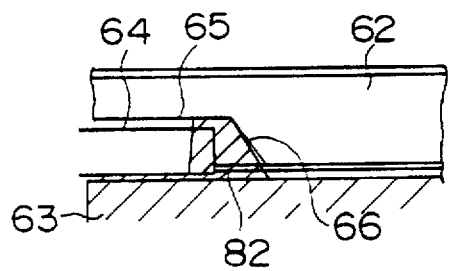

FIG. 16C shows an embodiment in which the space formed in the groove 65 between the optical fiber 64 and the reflection surface 66 is filled by a thermosetting resin 82 that has a refractive index generally equal to the refractive index of the core of the optical fiber 64. By providing such a resin 82, the optical beam emitted from the optical fiber 64 is guided without spreading, and an efficient optical coupling, similar to the effect achieved by the embodiment of FIG. 16A, is obtained.

Figure 16D:
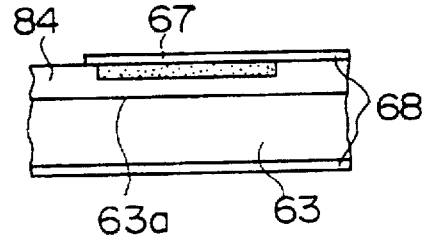

FIG. 16D shows an embodiment wherein an undoped or lightly doped n-type layer 84 is provided on the principal surface 63a of the substrate 63, and the diffusion region forming the photodiode 67 is formed in the n-type layer 84. By constructing the device substrate 63 as such, one can form the photodiode 67 in the form of a pin photodiode. Thereby, the response of the photodiode 67 is improved.

Further, the optical module of the present invention can be adapted for use in optical telecommunication that uses longer wavelengths by using InP for the device substrate 63. It should be noted that the photodiode 67 is formed integrally with the substrate 63. Further, it is possible to mass produce the optical connector element 62 by forming a stamper from a single crystal substrate processed to form the substrate 63 by an electrocasting process, and by using such a stamper as a mold for the injection molding process and the like.

Further, the present invention is not limited to the embodiments described heretofore, but various variations and modifications may be made without departing from the scope of the invention.

What is claimed is:

1. A method of manufacturing an optical path conversion device, comprising the steps of:

forming a depression having a round shape on an end surface of a glass substrate defined by a pair of major surfaces different from said end surface by a photolithographic patterning process such that said round depression extends generally parallel to said pair of major surfaces with a diameter that decreases toward an interior of said glass substrate;

providing a reflective coating on a surface of said round depression; and dividing said glass substrate along a plane parallel with said pair of major surfaces so as to bisect said depression, said step of dividing thereby producing a pair of half bodies each carrying a groove corresponding to said depression on an upper major surface thereof such that said groove continues from said upper major surface to an end surface of said half body corresponding to said end surface of said glass substrate.

2. A method of manufacturing an optical path conversion device, comprising the steps of:

forming a depression having a round shape on an end surface of a glass substrate defined by a pair of major surfaces different from said end surface by a photolithographic patterning process such that said round depression extends generally parallel to said pair of major surfaces with a diameter that decreases toward an interior of said glass substrate;

providing a reflective coating on a surface of said round depression;

dividing said glass substrate along a plane substantially perpendicular to said end surface so as to bisect said depression, said step of dividing thereby producing a pair of half bodies each carrying a groove corresponding to said depression on a major surface thereof such that said groove continues from said major surface to an end surface of said half body corresponding to said end surface of said glass substrate;

producing a die from said half body formed with said groove by an electrocasting process;

molding a resin in said die for producing a resin substrate such that said resin substrate has a groove corresponding in shape and size with said groove formed on said half body, on an upper major surface of said resin substrate; and providing a reflective coating on said round surface of said groove formed on said resin substrate.

3. A method as claimed in claim 2, wherein said step of providing a reflective coating comprises a step of providing multilayer films.

4. A method of manufacturing an optical path conversion device, comprising the steps of:

forming a depression having a round shape on an end surface of a glass substrate defined by a pair of major surfaces different from said end surface by a photolithographic patterning process, such that said round depression extends generally parallel to said pair of major surfaces with a diameter that decreases toward an interior of said glass substrate;

producing a die from said glass substrate formed with said depression by an electrocasting process;

molding a resin in said die for producing a resin substrate such that said resin substrate carries a depression corresponding in shape and size with said depression on said glass substrate, on an end surface of said resin substrate corresponding to said end surface of said glass substrate; and providing a reflective coating on said round surface of said depression formed on said end surface of said resin substrate; and dividing said resin substrate along a plane substantially perpendicular to said end surface of said resin substrate so as to bisect said depression, said step of dividing thereby producing a pair of half bodies each carrying a groove corresponding to said depression on a major surface thereof such that said groove continues from said major surface to an end surface of said half body corresponding to said end surface of said resin substrate.

* * * * *